United States Patent
Le Pinru et al.

(10) Patent No.: US 10,201,899 B2
(45) Date of Patent: Feb. 12, 2019

(54) MARKING OF THE TOOL CENTER AND OF THE ORIENTATION OF AN ACOUSTIC PROBE IN A REFERENCE FRAME, BY ULTRASOUND METHOD

(71) Applicant: AIRBUS GROUP SAS, Blagnac (FR)

(72) Inventors: Louis Le Pinru, Reze (FR); Nicolas Colin, Toulouse (FR); Guillaume Ithurralde, Colomiers (FR)

(73) Assignee: AIRBUS, Blagnac (FR)

( * ) Notice: Subject to any disclaimer, the term of this patent is extended or adjusted under 35 U.S.C. 154(b) by 408 days.

(21) Appl. No.: 15/106,809

(22) PCT Filed: Dec. 22, 2014

(86) PCT No.: PCT/EP2014/079021
§ 371 (c)(1),
(2) Date: Jun. 20, 2016

(87) PCT Pub. No.: WO2015/097166
PCT Pub. Date: Jul. 2, 2015

(65) Prior Publication Data
US 2017/0008173 A1    Jan. 12, 2017

(30) Foreign Application Priority Data
Dec. 23, 2013    (FR) ...................................... 13 63397

(51) Int. Cl.
*B25J 9/16* (2006.01)

(52) U.S. Cl.
CPC ........... *B25J 9/1692* (2013.01); *B25J 9/1694* (2013.01); *G05B 2219/37014* (2013.01); *G05B 2219/37269* (2013.01); *G05B 2219/39022* (2013.01); *Y10S 901/09* (2013.01)

(58) Field of Classification Search
CPC ................. B25J 9/1692; B25J 9/1694; G05B 2219/37014
See application file for complete search history.

(56) References Cited

U.S. PATENT DOCUMENTS

| 4,155,243 A | 5/1979 | Elsner |
| 4,821,206 A | 4/1989 | Arora |
| 6,182,494 B1 | 2/2001 | Reed et al. |
| 2009/0282895 A1 | 11/2009 | Hain et al. |
| 2009/0299688 A1 | 12/2009 | Kohler |

FOREIGN PATENT DOCUMENTS

WO    2009/127610 A1    10/2009

*Primary Examiner* — Erika J Villaluna
(74) *Attorney, Agent, or Firm* — Im IP Law; C. Andrew Im; Chai Im

(57) ABSTRACT

A process for marking the real position and real orientation of a tool in relation to the manipulator arm of a robot. The process utilizes the amplitude measurements of acoustic signals and the flight time measurement of the acoustic waves emitted by an acoustic probe of the tool and reflected by the fixed reference elements. The position of the center of reference of the probe relative to the end of the manipulator arm is determined. The axes X and Y defining the plane of the probe along reference axes X' and Y' of known orientations are oriented so that the modification of the position and of the orientation of the probe in the reference frame can be defined. The displacements of the manipulator arm are managed by the controller based on the position of the probe in relation to the manipulator arm and the reference orientation of the probe.

7 Claims, 5 Drawing Sheets

MARKING OF THE TOOL CENTER AND OF THE ORIENTATION OF AN ACOUSTIC PROBE IN A REFERENCE FRAME, BY ULTRASOUND METHOD

RELATED APPLICATIONS

This application is a § 371 application from PCT/EP2014/079021 filed Dec. 22, 2014, which claims priority from French Patent Application No. 13 63397 filed Dec. 23, 2013, each of which is incorporated herein by reference in its entirety.

BACKGROUND OF THE INVENTION

Field of the Invention

The invention relates to the general field of robot manipulators. This invention is particularly advantageously applicable to the field of robotics associated with that of non-destructive testing.

Prior Art

In the field of manufacturing mechanical parts or testing produced parts by means of robotic mechanical arms, it is generally necessary to precisely determine the tool center point or TCP and the orientation of the reference axis of the tool mounted on the manipulator arm in the robot's frame of reference. In this way, the logic controller that manages the movements of the robot and of the manipulator arm may deduce, at any instant, the precise position and orientation of the tool in space. For a machining tool for example, the reference axis is generally the axis of penetration of the tool into the part to be machined.

To allow the robot to take precise account of the positioning and orientation of the tool, a learning phase is generally employed prior to the use of the tool.

Starting from the dimensions and geometry of the tool in question and knowing the way in which the tool is mounted on the manipulator arm of the robot, a known solution for carrying out such learning consists of taking these parameters into account in order to determine, a priori, the position and orientation of the tool in a frame of reference linked to the robot.

To the extent that it requires no operation prior to the use of the robot, such "a priori" determination has a definite economic advantage. However, such a method has limitations in terms of precision to the extent that the positioning of the tool on the robot after mounting is determined as far as positioning uncertainties allow.

Another known solution for carrying out such learning consists of calibrating the tool-equipped robot by using a reference mark or set of reference marks, occupying fixed positions and defining reference points and axes, with which either the tool center point itself, or a tip mounted on the manipulator arm and positioned at the tool center point, are successively placed in contact.

Such a method allows learning to be carried out that is much more precise than the method described above. However, it requires a relatively tricky and tedious calibration phase to be implemented before using the tool, generally carried out in manual mode by a human operator. Furthermore, such a method is only actually effective if the tool implemented by the robot is a mechanical tool whose TCP is easily identifiable. On the other hand, if the tool center point is a virtual point, the use of known calibration procedures is more difficult to implement. This is especially the case if the tool employed is a tool intended to test the integrity of parts made of composite material which comprises a synthetic acoustic probe. For such a tool the tool center point, which corresponds to the center of the probe, and the axis of the tool, which is defined by the direction that is normal to the plane of the probe and passes through the center of the probe, do not have a hardware basis.

PRESENTATION OF THE INVENTION

An aim of the invention is to propose a method allowing the tracking of the "tool center point" of a tool comprising a synthetic acoustic probe, mounted on a robotic arm, without having to use an auxiliary tool to carry out this tracking.

To this end, a subject of the invention is a method for carrying out the tracking of the position and orientation of a tool comprising a synthetic acoustic probe mounted on the manipulator arm of a robot, the plane of said acoustic probe being defined by two perpendicular axes X and Y, said tracking being carried out in a frame of reference known to said robot. The method according to the invention mainly comprises the following steps:

a first step in which the distance between the acoustic probe and a point on the surface of a point reference target occupying a fixed position is determined by means of the acoustic probe. This distance is determined for three different positions of the acoustic probe with respect to the target, the position of the acoustic probe with respect to the manipulator arm being geometrically deduced from the measurements carried out;

a second step in which amplitude and/or flight time measurements made by the acoustic probe are used in order to carry out the tracking of a fixed reference axis X', marked by a rectilinear tubular target, while moving the acoustic probe and successively positioning it at different points on said axis X' and in order to align the reference axis X of the acoustic probe with the fixed reference axis X';

a third step in which the acoustic probe is moved along an axis Y' that is perpendicular to the fixed reference axis X' and amplitude and/or flight time measurements, made by the acoustic probe itself, are used in order to modify the orientation of the plane of the acoustic probe so as to align the axis Y of the acoustic probe with this perpendicular axis Y'.

According to the invention, the parallel alignment of the axis X of the acoustic probe with the reference axis X' and the alignment of the axis Y of this same probe with the axis Y' defines a reference orientation of the acoustic probe from which the changes of orientation imposed on the acoustic probe by the manipulator arm of the robot are determined.

According to one mode of implementation of the method according to the invention, the tracking of the fixed reference target is carried out by moving the acoustic probe closer to said fixed reference target along a given direction of approach until the focal zone of the acoustic probe is positioned on the surface of the target, and by measuring the distance then separating the acoustic probe from the surface of the target. This operation is repeated for three separate directions of approach.

According to another mode of implementation, the tracking of the reference axis X' is carried out by moving the acoustic probe closer to the reference axis X' at different points on the latter, until the focal zone of the acoustic probe is positioned at the level of the axis X' for each measurement point in question, then by determining, for each point, the sensor that received the reflected signal with maximum amplitude for one and the same flight time in question.

According to another mode of implementation, the alignment, during the second step, of the axis X of the acoustic probe with the reference axis X' is carried out, after tracking of the reference axis X', by actuating the manipulator arm of the robot so as to position the acoustic probe along an orientation such that the signal reflected by the reference axis is received with maximum amplitude by sensors forming one and the same first row that is aligned along the axis X of the probe and that the end sensors of this row receive the signal reflected by the reference axis X' with substantially equal amplitudes and flight times.

According to another mode of implementation, the alignment of the axis X of the acoustic probe with the reference axis X' is carried out by actuating the manipulator arm of the robot so as to position the acoustic probe along an orientation such that the signal reflected by the reference axis X is received with maximum amplitude by sensors forming the middle row of the acoustic probe along the axis Y.

According to another mode of implementation, during the third step, the acoustic probe is moved by the manipulator arm translationally along a direction Y' that is perpendicular to the fixed reference axis X', in such a way that the signal reflected by the reference axis X' is received with maximum amplitude by sensors forming a second row, separate from the first row of sensors used for aligning the axis X of the probe with the reference axis X'. Then it is subjected to a rotational movement of its plane about the axis X in such a way that the amplitude of the acoustic signal received by the sensors forming this second row is substantially equal to that received during the second step by the sensors forming the first row.

According to another mode of implementation, the position of the acoustic target and the position and orientation of the reference axis in the frame of reference are determined a priori, and a first approximate positioning of the acoustic probe in the frame of reference is defined theoretically, so that the steps of the method are carried out automatically by the logic controller that manages the movements of the manipulator arm of the robot and the implementation of the acoustic probe.

The invention advantageously allows the tracking process for precisely positioning a tool comprising an acoustic probe in the frame of reference of the manipulator robot on which it is mounted to be improved and simplified, this positioning being determined by the position of the tool center point, or TCP, and by the orientation of the tool.

The invention is advantageously as much of interest to robotics engineers responsible for the non-destructive testing of mechanical parts in an industrial environment as it is to operators working in a laboratory context.

DESCRIPTION OF THE FIGURES

The features and advantages of the invention will be better appreciated by virtue of the description of the exemplary implementation which follows, which description relies on the appended figures which show.

DETAILED DESCRIPTION

The principle of the invention consists of taking advantage of the fact that the tool mounted on a manipulator arm of a robot comprises an acoustic probe in order to determine the position of the tool center point, i.e. the center of reference of the acoustic probe, and the orientation of the tool in the robot's frame of reference.

For this purpose, the invention proposes using the information provided by the acoustic probe, which information is mainly derived from the flight time and amplitude measurements of the received signal.

The following description presents, by means of an exemplary implementation, one mode of implementation according to the invention that illustrates this principle of calibration via acoustic measurements.

The tool in question here is a tool for the non-destructive testing of a part made of composite material which comprises a synthetic acoustic probe formed by an arrangement of a plurality of sensors (acoustic transducers). This exemplary implementation is of course in no way intended to limit the scope or extent of the invention. In particular, it will be evidently apparent to a person skilled in the art that the tracking principle disclosed here may of course be used in the case of a tool comprising any acoustic probe, whether synthetic or not.

Figure 1:
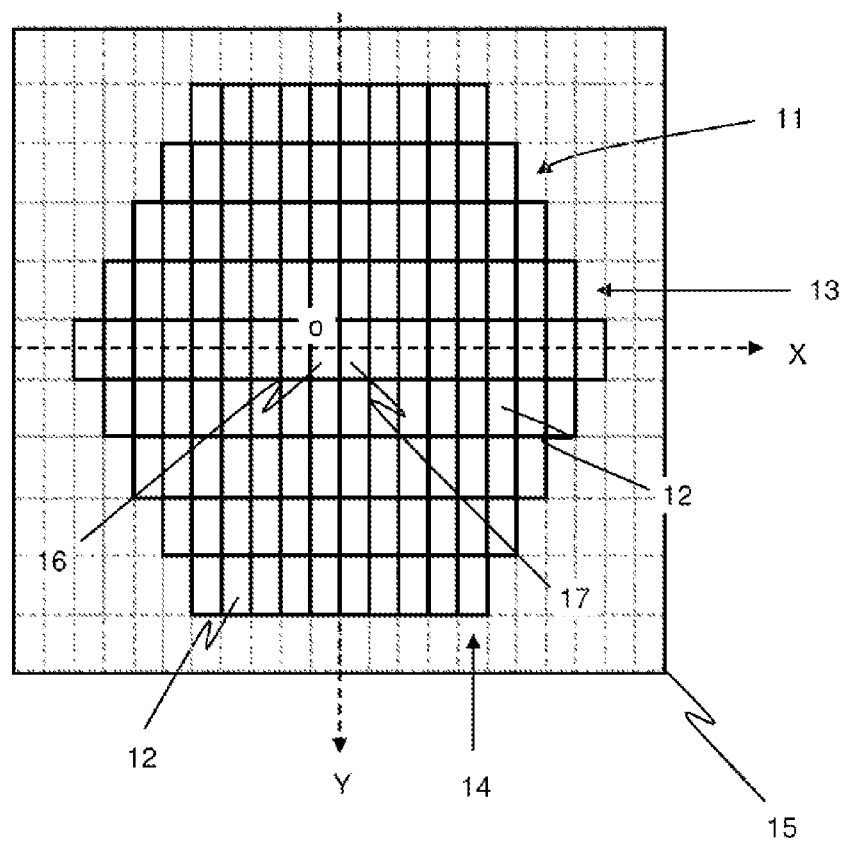
FIG. 1, a diagrammatic representation of a synthetic acoustic probe such as that used in the exemplary implementation in question.

In the proposed example, the synthetic acoustic probe 11 is composed of a plurality of elementary acoustic sensors 12 that are arranged according to a planar matrical layout such as illustrated by FIG. 1. The elementary sensors 12 are placed on a planar support 15 so as to form an arrangement of rows 13 and columns 14 whose geometry is defined by tracking the position of the various sensors in a system of orthogonal axes X and Y that determine the orientation of the probe in space. The arrangement of the various sensors forming the acoustic probe defines a reference point that corresponds, for example, to the central sensors 16 and 17 of the probe.

Figure 2:
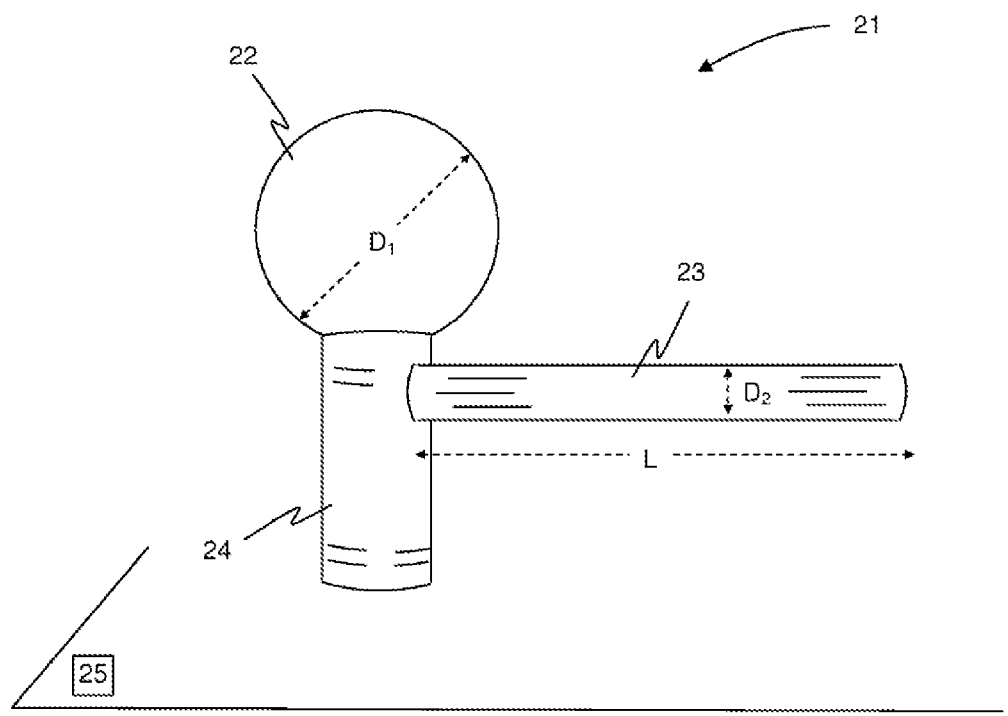
FIG. 2, a diagrammatic representation of an exemplary device allowing the method according to the invention to be implemented.

The method according to the invention uses an auxiliary tracking device that occupies a given fixed position, a device such as that illustrated by FIG. 2 for example. This device 21 comprises an element having a spherical surface, a ball 22 for example. This ball is associated with an elongated rectilinear element that has a given cross section across its width, preferably a rod 23 with a circular cross section, which constitutes a reference axis X'. According to the invention, the diameter of the ball 22 is determined so as to form a point element viewed from the acoustic probe, taking into account the resolution of the latter. Likewise, the diameter of the rod 23 is determined so as to present, viewed from the acoustic probe 11, a longitudinal edge forming an element that reflects the acoustic waves. In the case of a synthetic acoustic probe taken here as an example, the diameter of the ball 22 and the cross section of the rod 23 are chosen according to the dimensions and spacing of the elementary sensors 12 that constitute the source 11.

In one preferred embodiment, the auxiliary device 21 according to the invention comprises, as illustrated in FIG. 2, a spherical ball 22 with a determined diameter that is mounted on a support 24 and to which the rod 23 forming the fixed reference axis X' is fixed. The assembly is, preferably, configured so that when the device is placed on a reference plane 25 (a horizontal plane for example), the rod 23 is located in a plane that is parallel to the plane on which the device is placed.

Figure 3:
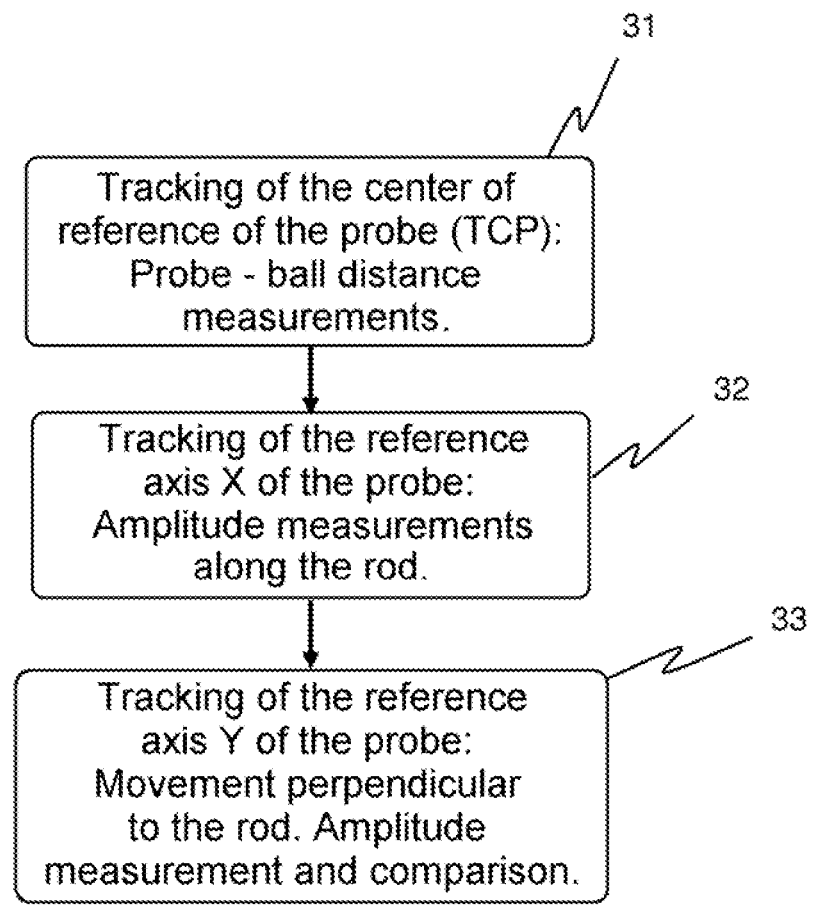
FIG. 3, a basic flowchart of the main steps of the method according to the invention.

As illustrated by the flowchart of FIG. 3, the method according to the invention implements the device 21 in order to carry out the following tracking operations:

a first step 31 of tracking the position of the reference point of the probe (TCP) via distance measurement (flight time measurement) of the ball 22 using the acoustic probe 11 in various orientations;

a second step 32 of tracking the reference axis X of the acoustic probe 11, carried out by positioning the axis X in parallel to the axis X' of the rod 23, on the basis of distance measurements carried out at various points on the rod 23;

a third step 33 of tracking the reference axis Y of the acoustic probe 11, carried out on the basis of distance measurements made while moving the acoustic probe perpendicularly to the rod 23.

The function of the first step of the method is to allow the precise position of the acoustic probe 11, i.e. that of its center, in a frame of reference of the robot, and consequently the position of the acoustic probe 11 with respect to the end of the manipulator arm of the robot, to be determined. As for the second and third steps, their function is to allow a reference orientation of the acoustic probe 11, defined in this same frame of reference, and consequently the orientation of the probe with respect to the end of the manipulator arm, to be determined. This reference orientation is, for example, defined as the orientation in space of the axis that is normal to the plane of the acoustic probe.

According to the invention, the first step 31 consists of bringing the acoustic probe 11 in proximity to the surface of the ball 22 and making at least three distance measurements while positioning the probe at three different places in the vicinity of the ball, in such a way that the corresponding distance measurements are made along three substantially separate directions of approach. For each positioning, the position of the end of the manipulator arm is also recorded. Three measurements along three different directions are thus obtained, which are then used together by the logic controller that controls the manipulator arm to geometrically determine, in a known manner, the position of the acoustic probe 11 in the robot's frame of reference. The ball-probe distances are determined here, in a known manner, via measurement of the flight times of the transmitted acoustic wave.

Figure 4:
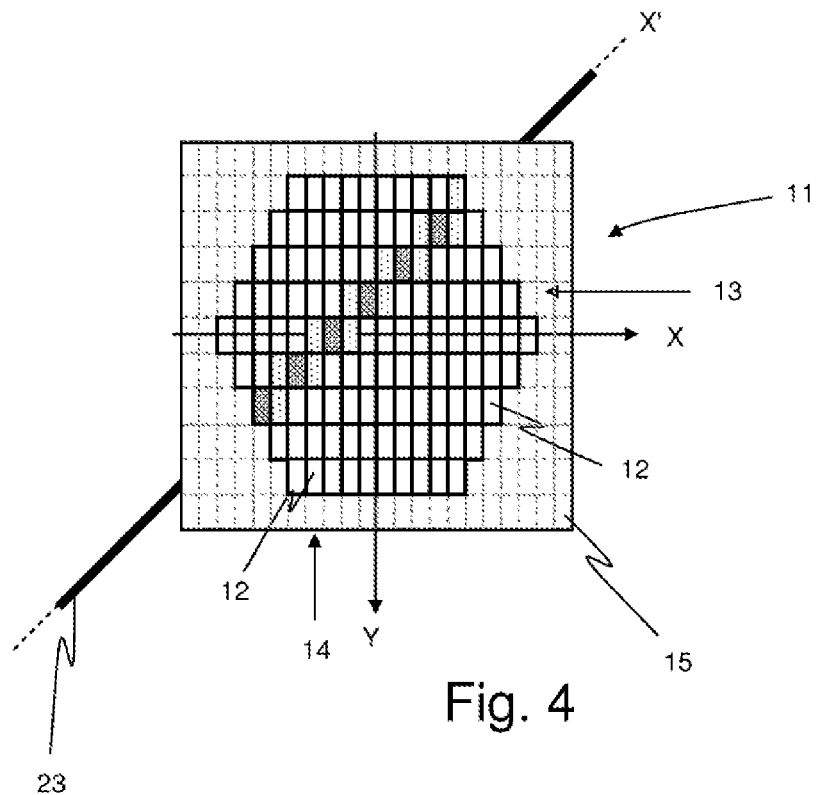
FIGS. 4 and 5, illustrations relating to the second step of the method according to the invention.
Figure 5:
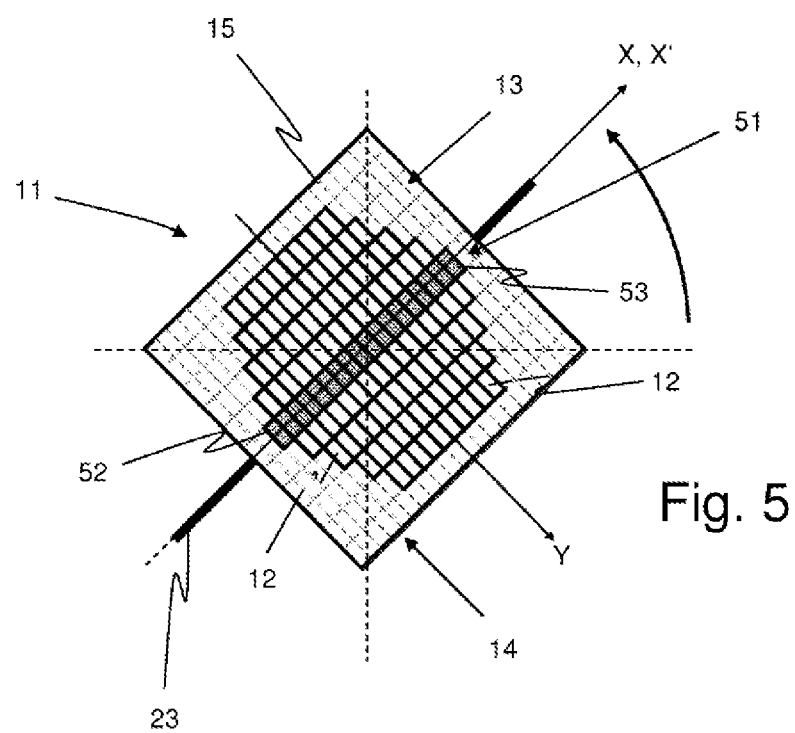

Step 32 is illustrated by FIGS. 4 and 5. It consists of positioning the reference axis X of the acoustic probe along a fixed direction known to the robot, or more precisely, to the logic controller that manages the movements of the robot's arm.

In order to position the reference axis X in a direction known to the robot, firstly the acoustic probe 11, and hence the end of the robot's arm, is moved so as to position the acoustic probe to face the rod 23.

Then, secondly, the acoustic probe 11 is translationally moved in parallel to the rod 23, i.e. in parallel to the fixed reference axis X', while recording the movement of the end of the manipulator arm, without changing the orientation thereof, and measurements of the amplitude of the acoustic signal received by the various sensors are periodically made. To do this, an acoustic wave is transmitted in the direction that is normal to the plane of the probe 11 and it is determined which sensors detect the wave reflected by the rod 23 with the greatest amplitude. As the rod 23 is, as a matter of principle, rectilinear, these sensors are aligned along a given direction in the plane of the probe.

Thirdly and lastly, while proceeding with measurements of the amplitude of the acoustic signal reflected by the rod 23, the end of the manipulator arm is acted upon so as to move the acoustic probe 11 and to make it pivot in order to position the reference axis X of the probe in parallel to the fixed reference axis X' formed by the rod 23, in such a way that the sensors detecting the wave reflected by the rod 23 with the greatest amplitude form a first row 51 that is aligned with the axis X.

The end of the manipulator arm is then once more actuated so as to make the plane of the acoustic probe pivot in relation to an axis that is perpendicular to the axis of the rod 23 in such a way that the sensors 52 and 53 that are located at the ends of the preceding alignment of sensors 51 detect the reflected wave with substantially identical flight times.

Thus, once the second step has been carried out, the acoustic probe is positioned in such a way that its reference axis X is parallel to the axis X' of the rod 23 whose direction is known to the robot and that the sensors detecting the wave reflected by the rod 23 with the greatest amplitude are aligned with the axis X.

Figure 6:
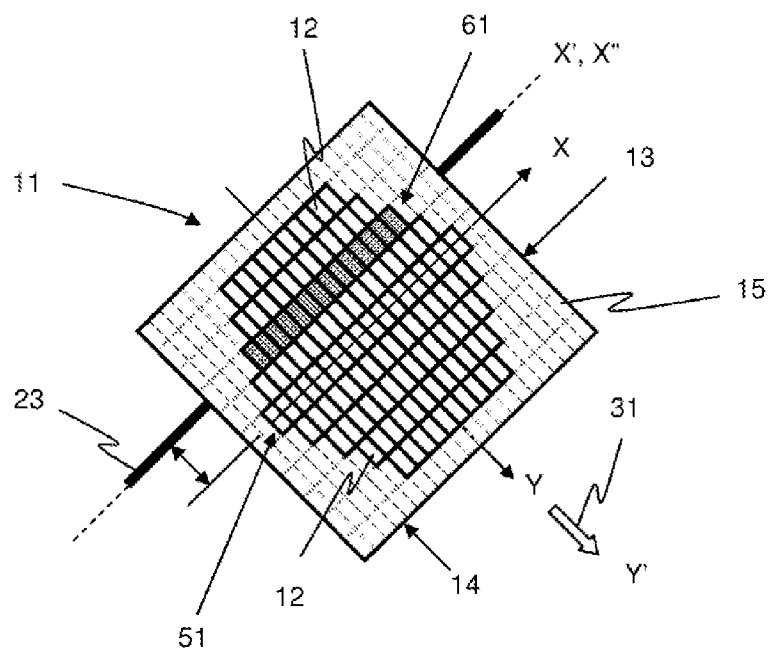
FIGS. 6 and 7, illustrations relating to the third step of the method according to the invention.
Figure 7:
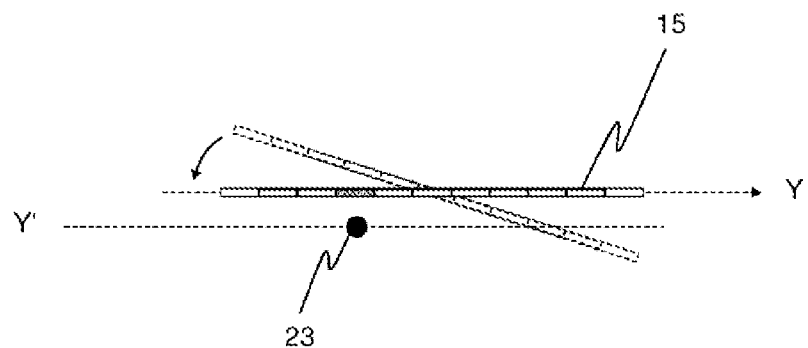

Step 33, illustrated by FIGS. 6 and 7, then consists of positioning the reference axis Y of the probe along a direction known to the robot.

In order to carry out this positioning, firstly the acoustic probe 11 is translationally moved along a direction Y' that is perpendicular to the axis X' of the rod 23, while recording the movement of the end of the manipulator arm, without changing the orientation of the acoustic probe. The acoustic probe is moved so that the sensors detecting the wave reflected by the rod 23 with the greatest amplitude are located in a row 61 that is aligned with an axis X" of the plane of the probe parallel to the axis X and separate from the latter. The movement carried out thus defines an axis Y' that is perpendicular to the axis X, whose orientation is known to the robot.

Consequently, the movement along this axis Y' having been carried out, the amplitude and/or flight time measured by the sensors of the row 61, aligned with the axis X", is compared so as to determine whether it is different from that measured during step 32 by the sensors of the row 51 aligned with the axis X. If so, a rotation of the plane of the probe about the axis X is carried out, as illustrated by FIG. 7, so as to obtain a signal corresponding to one and the same flight time in both cases. Consequently, the reference axis Y is aligned with the axis Y.

According to the invention, the recording of the movements carried out by the end of the manipulator arm during the two steps 32 and 33 in order to follow the axis of the rod 23, and the shift along the axis Y' associated with that of the rotational movements performed in order to change the orientation of the acoustic probe 11 during these same steps, are used to identify a reference orientation of the plane of the probe (i.e. the axes X and Y) along known directions X' and Y' defined in the frame of reference. In this way, if it is desired to link a precise position to the acoustic probe 11 by giving it a defined orientation, it suffices to move the end of the manipulator arm and to change the orientation of the acoustic probe from this known orientation so as to make it adopt the desired orientation.

As described above, the calibration method according to the invention advantageously makes use of the capability of the acoustic probe 11 comprised by the employed tool to carry out both measurements of the amplitude of the received acoustic signal and measurements of the flight time of the acoustic wave, these measurements being used to determine the position of the probe with respect to the manipulator arm and a reference orientation of the acoustic probe with respect to the fixed frames of reference used for the calibration. It is thus possible, without implementing additional tooling at the level of the tool, to define a reference positioning of the acoustic probe, a positioning which, when in operation, allows the robot to precisely determine the changes in the position and orientation of the manipulator arm that are to be performed in order to position the acoustic probe 11 at the desired location above the part to be tested, with the desired orientation with respect to the surface of the part.

As stated above, the learning operations are carried out while the robot, whose manipulator arm bears the tool in question, is placed in an appropriate operating mode.

This operating mode may be a manual mode, in which the movements of the manipulator arm are directly controlled by an operator and the logic controller responsible for controlling the robot then simply carries out the acquisition of variations in the position and attitude of the manipulator arm during the various phases, the measurements made by the acoustic probe then being interpreted by the operator in order to assess the correct positioning of the acoustic probe for each phase.

Alternatively, this operating mode may be an automatic mode. In this case the logic controller possesses predetermined theoretical information on the positioning and orientation of the acoustic probe 11, as well as information on the positioning of the fixed reference elements (ball 22 and rod 23), the learning role then being for refining this information. The logic controller then proceeds by itself, in each step, to an a priori positioning of the acoustic probe 11 and refines this positioning by virtue of the measurements provided thereby, so that the target point, a point on the surface of the ball 22 or a point on the surface of the rod 23, are located in the focal plane of the acoustic probe 11.

The invention claimed is:

1. A method for tracking a position and an orientation of a tool comprising a synthetic acoustic probe mounted on a manipulator arm of a robot, a plane of the acoustic probe being defined by two perpendicular axes X and Y, the tracking is carried out in a frame of reference known to the robot, the method comprising the steps of:
   determining distances between the acoustic probe and a target point on a surface of a reference target occupying a fixed position for three different positions of the acoustic probe with respect to the reference target by the acoustic probe to geometrically determine a position of the acoustic probe with respect to the manipulator arm;
   tracking a fixed reference axis X' marked by a rectilinear tubular target while moving the acoustic probe and successively positioning the acoustic probe at different points on said reference axis X' by utilizing at least one of amplitude and flight time measurements by the acoustic probe, and aligning the axis X of the acoustic probe with the fixed reference axis X';
   moving the acoustic probe along an axis Y' which is perpendicular to the fixed reference axis X' and utilizing at least one of the amplitude and flight time measurements by the acoustic probe to modify an orientation of the plane of the acoustic probe to align the axis Y of the acoustic probe with the axis Y'; and
   wherein the parallel alignment of the axis X of the probe with the reference axis X' and the alignment of the axis Y of the probe with the axis Y' defines a reference orientation of the acoustic probe from which orientation changes imposed on the acoustic probe by the manipulator arm of the robot are determined.

2. The method as claimed in claim 1, wherein the step of tracking comprises the steps of:
   (a) moving the acoustic probe closer to the reference target along a given direction of approach until a focal zone of the acoustic probe is positioned on the surface of the reference target;
   (b) measuring a distance separating the acoustic probe from the surface of the reference target; and
   repeating the steps (a) and (b) for three separate directions of approach.

3. The method as claimed in claim 1, wherein the step of tracking comprises the steps of moving the acoustic probe closer to the reference axis X' at different points on the latter until a focal zone of the acoustic probe is positioned at a level of the reference axis X' for each point of measurement; and determining, for each point, a sensor that received a reflected signal with a maximum amplitude for a same flight time.

4. The method as claimed in claim 1, wherein the axis X of the acoustic probe is aligned with the reference axis X', after tracking the reference axis X', by actuating the manipulator arm of the robot to position the acoustic probe along an orientation such that an acoustic signal reflected by the reference axis X' is received with a maximum amplitude by sensors forming a first row of the acoustic probe that is aligned along the axis X of the acoustic probe and two end sensors of the first row receive the acoustic signal reflected by the reference axis X' with equal flight times.

5. The method as claimed in claim 4, wherein the axis X of the acoustic probe is aligned with the reference axis X' by actuating the manipulator arm of the robot to position the acoustic probe along the orientation such that the acoustic signal reflected by the reference axis X' is received with the maximum amplitude by sensors forming a middle row of the acoustic probe along the axis Y.

6. The method as claimed in either of claim 4, wherein the step of moving the acoustic probe comprises the steps of moving the acoustic probe translationally along a direction Y' that is perpendicular to the reference axis X' by the manipulator arm such that the acoustic signal reflected by the reference axis X' is received with the maximum amplitude by sensors forming a second row, separate from the sensors of the first row used for aligning the axis X of the acoustic probe with the reference axis X; and
   subjecting the acoustic probe to a rotational movement of its plane around the axis X such that an amplitude of the acoustic signal received by the sensors forming the second row is equal to an amplitude of the acoustic signal received by the sensors forming the first row.

7. The method as claimed in claim 1, wherein the position of the acoustic probe at an instant in question, and positions and orientations of the reference target and the rectilinear tubular target in the frame of reference are determined theoretically and transmitted to a logic controller, the logic controller proceeds to a priori positioning of the acoustic probe and refines the positioning of the acoustic probe based on the measurements provided by the acoustic probe to locate the target point at the instant in question in a focal plane of the acoustic probe.

* * * * *